United States Patent [19]

Frederick et al.

[11] 4,363,654

[45] Dec. 14, 1982

[54] PRODUCTION OF REDUCING GAS FOR FURNACE INJECTION

[76] Inventors: Geoffrey Frederick, 7 Knowsley Close, Pinkneys Green, Maidenhead, Berkshire; Anthony Dwight, 19 Fernbrook Rd., Reading RG4 7HG, Berkshire, both of England

[21] Appl. No.: 138,624

[22] Filed: Apr. 8, 1980

[51] Int. Cl.$^3$ ............................................ C21B 11/00
[52] U.S. Cl. ........................................ 75/34; 75/31; 75/41
[58] Field of Search ...................... 423/650; 75/26, 34, 75/31, 41

[56] References Cited

U.S. PATENT DOCUMENTS

| | | | |
|---|---|---|---|
| 2,795,559 | 6/1957 | Whaley | 252/374 |
| 3,053,648 | 9/1962 | Stephens | 75/26 |
| 3,097,082 | 7/1963 | Guptill | 423/650 |
| 3,442,613 | 5/1969 | Grotz | 423/354 |
| 3,864,465 | 2/1975 | Hoffert | 75/34 |
| 4,089,798 | 5/1978 | Sugiyama | 75/34 |
| 4,213,954 | 7/1980 | Pinto | 423/359 |
| 4,220,469 | 9/1980 | Tippmer | 75/34 |
| 4,224,299 | 9/1980 | Barber et al. | 423/360 |

FOREIGN PATENT DOCUMENTS 1156602  4/1969  United Kingdom .

Primary Examiner—P. D. Rosenberg
Attorney, Agent, or Firm—Marvin A. Naigur; John E. Wilson; Warren B. Kice

[57] ABSTRACT

A process for producing a reducing gas for a direct reduction or blast furnace which comprises partially oxidizing oil and/or coal and/or coke in the presence of air to produce a gas stream containing hydrogen and nitrogen together with other gases, treating the gas stream to remove substantially all gases other than hydrogen and nitrogen, drying the gas stream if there is water present, subjecting the gas stream to a separation stage, e.g. in a cryogenic separator, to separate a hydrogen-rich gas stream and a nitrogen-rich gas stream, heating the hydrogen-rich gas stream and injecting it into the furnace.

In the case of a direct reduction furnace the gas stream may be obtained by partial oxidation of coal and/or oil. In the case of the blast furnace the reducing gas may be derived from the top gas in addition or as an alternative to partial oxidation of coal and/or oil.

10 Claims, 4 Drawing Figures

PRODUCTION OF REDUCING GAS FOR FURNACE INJECTION

This invention relates to a method for supplying a reducing gas to a furnace, e.g. a direct reduction furnace or a blast furnace. In a preferred embodiment the invention relates to a method for reducing iron ore to metallic iron in the solid state by a continuous process employing reducing gases mainly containing hydrogen, together with some carbon monoxide, the reducing gas being generated from hydrocarbon feedstocks, such as those heavier than naphtha or from coal by a process of partial oxidation using air as the oxidant.

There are several methods of direct reduction of iron ores utilizing various types of equipment in which the reduction of the iron ores takes place. Normally these processes are continuous as in the case of those of Purofer, Midrex and Armco. However, batch processes, such as that of HyL, are also used. Reducing gas is generally produced by the steam reforming of desulphurised natural gas which produces a hot reducing gas which is sufficiently rich in carbon monoxide and hydrogen such that it is suitable for direct injection into the reduction equipment. In some cases exit gas from the top of the reduction equipment, which contains water and carbon dioxide as well as unused hydrogen and carbon monoxide, is cleaned and compressed and used as an oxidant to reform the hydrocarbon feed to produce more hydrogen and carbon monoxide. Other processes, such as partial oxidation, exist where heavy feedstocks are oxidised with oxygen, the gas made being cooled and quenched to produce a reasonably high purity reducing gas which is mixed with recycle gas which can be reheated to give hot gas suitable for injection into the reduction equipment. However, in this case the ratio of carbon monoxide to hydrogen is somewhat higher than that in the natural gas steam reforming method and problems in heating gases containing substantial quantities of CO can occur, in particular carbon deposition according to the Boudouard reaction:

$$2CO \rightarrow CO_2 + C$$

This causes difficulty of design of reliable heat exchange equipment which will not block and special heaters with high pressure drops are required. The above reaction also contributes to carburisation of the product iron. Although some carburisation is desirable the levels achieved in many direct reduction plants of this type is higher than desired from the point of view of the subsequent iron product melting step.

In the conventional blast furnace process for production of iron from iron ores and concentrates, the primary reductant is metallurgical coke which is fed into the top of the furnace in layers with the ore. Preheated air blown into the tuyeres at the base of the furnace produces carbon monoxide by reaction with the descending stream of coke, which then reduces the iron ore through the oxide stages to produce liquid iron at the base. Carbon dioxide, unreacted carbon monoxide, and nitrogen from the injected air leave the top of the furnace. A portion of this top gas is burnt in the stoves which are used to preheat the inlet air fed to the tuyeres but such are temperature limitations at the base of the furnace that only about one third of the total top gas is able to be used in this application.

In a steelworks where coke is produced on the same site some of the remainder of the gas is fed to heat the coke over plant which converts coking coal to metallurgical coke. However, the calorific value of the blast furnace top gas is so low that the gas cannot be used in such applications alone with conventional coke oven designs and it must be blended with considerable quantities of coke oven gas which has a higher calorific value thus reducing the amount of blast furnace gas which can be used in this application. In addition, in some steelworks, surpluses of coke oven gas exist which in the past before the advent of natural gas for domestic use were sometimes sold as medium calorific value town gas. Thus in some situations an effective overall low grade fuel surplus may exist which results in blast furnace gas having given a lower value than would be expected from consideration of its heat content, even though in the fully integrated steelworks where product furnishing operations are involved, no overall surplus fuel does exist.

The metallurgical coke supplied to blast furnaces must have special properties such as high crushing strength, which is necessary to maintain the porosity of the bed in the furnace, and to a lesser extent the coke must have a minimum amount of reactivity. Supplies of suitable coal necessary to make these special types of coke are not always available in sufficient quantities in some areas of the world, or, if they are, they are very expensive. Currently, prices of metallurgical coking coals are often around twice the value of that which would correspond to their fuel value. Therefore, there is a demand to reduce the amount of metallurgical coke required by blast furnaces. A number of methods have been proposed including, raising air blast temperatures, injecting oil as a cheaper form of carbon into the blast furnace tuyeres, injecting pulverised coal in a similar manner or combination oil and coal, injecting hydrogen and carbon monoxide containing reducing gas (for example, obtained by steam and/or carbon dioxide reforming of natural gas or light naphtha or by partial oxidation of heavier feeds with oxygen) into the tuyeres or high up the furnace into the bosh region above the tuyeres, and recycling blast furnace gas, after removal of carbon dioxide and water, into the tuyeres, the diluent effect of the contained nitrogen being offset by using oxygen-enriched air at the tuyeres.

Although considerable metallurgical coke savings are possible, all these schemes have certain limitations. In particular, the direct oil and coal injection schemes require heat input to balance the heat required to thermally crack the oil and/or coal at the base of the furnace and hence a higher blast temperature is required even with limited oil and/or coal injection.

The amount of injection of oil or solid fuels that can be introduced at the tuyeres has been found to be limited by operating difficulties in the furnaces, such as "hanging" and in the top gas cleaning equipment due to accumulation of soot.

Also, the injection of oil or solid fuel into the tuyeres with oxygen-enriched blast air has caused problems, in that the tuyeres have tended to burn away. The limitations of such proposals alone can be expressed in terms of the amount of oil or solid fuel that can be injected into the blast furnace, rather than in terms of the minimum amount of coke per se which is necessary for the blast furnace operation for reasons such as bed permeability.

It can be suggested that there is a degree of independence between oil or solid fuel injection at the tuyeres and reducing gas injection further up the shaft, in the sense that when the practical limit of oil or solid fuel injection has been reached it may still be possible to achieve a supplementary reduction in metallurgical coke consumption by injecting reducing gas at a higher point in the blast furnace. However, reducing gas injection does not achieve as much coke saving as would be expected from its reducing value, since about half of the injected hydrogen leaves the top of the blast furnace unchanged and without accomplishing anything. The reformer applications suffer from the disadvantage that it is only possible to directly reform light feedstocks such as natural gas or light naphtha and even indirect reforming processes (such as a combination of the "catalytic rich gas" process with steam reforming) are only able to handle slightly heavier feedstocks. All these are premium priced hydrocarbons in view of their high demand for chemicals production. There is also considerable reluctance to use the extremely large quantities of clean fuel such as natural gas as a blast furnace reductant. The partial oxidation of heavier oil feeds and coal and the known blast furnace recycling schemes require considerable quantities of oxygen which although available are not cheap.

The most economic and attractive route for saving metallurgical coke by hydrocarbon substitution appears to be by the use of heavy oil or solid fuel, either for direct injection or for gasification and injection without using oxygen, or the use of a process which allows production of an acceptable reducing gas for blast furnaces from the surplus top gases from a blast furnace.

It is an object of the present invention to provide a process for the production of reducing gases which may be utilized in both direct reduction furnaces and blast furnaces.

Therefore according to the present invention there is provided a process for producing a reducing gas for a direct reduction or blast furnace which comprises partially oxidising oil and/or coal and/or coke in the presence of air to produce a gas stream containing hydrogen and nitrogen together with other gases, treating the gas stream to remove substantially all gases other than hydrogen and nitrogen, drying the gas stream if there is water present, subjecting the gas stream to a separation stage to separate a hydrogen-rich gas stream and a nitrogen-rich gas stream, heating the hydrogen-rich gas stream and injecting it into the furnace.

The process of the invention is based on the fact that hydrogen and nitrogen mixtures can be separated with ease in view of the large difference in their properties. The simplest method of separating the gases is by cryogenic treatment although other separation methods which rely on the difference in molecular size of the gases, e.g. differential adsorption methods, or diffusivity, may also be used.

In a preferred embodiment the nitrogen and hydrogen under pressure are separated in a cryogenic separator. The separator may use Joule Thomson cooling and regenerative heat exchange, low temperature work expanders, supplementary refrigeration or any combination thereof. Suitable cryogenic separators are well known and commercially available. The separated hydrogen which may contain a little nitrogen, leaves the cryogenic separator at a slightly lower pressure than its inlet pressure and is heated, expanded through a turbine, reheated and injected into the furnace at a suitable point. The power generated by the expansion of hydrogen may contribute to that required for the gas compressor used for the partial oxidation.

The nitrogen stream leaves the cryogenic separator at a somewhat lower pressure than its inlet pressure but nevertheless may still give useful power when heated and passed through an expansion turbine.

The method of the invention produces hot reducing gases from heavy oil or coal suitable for injection into any of the existing types of direct reduction furnaces. The technical and economical advantages of this scheme are that no oxygen plant is required since the reducing gas is produced using air as the oxidant. This is of particular advantage in reducing investment and running costs, particularly in remote locations where units of limited capacity are involved. Other advantages are that little sensitive catalyst is required in contrast to the reformer method. Since the reducing gas produced that is heated is high in hydrogen and contains little carbon monoxide, problems of carbon deposition do not occur. Moreover, according to one embodiment of the invention, the carbon monoxide content of the reducing gas in the reduction furnace itself can be adjusted independently and thus genuine control can be exercised over the carbon contained in the product iron. Further advantages of the invention are due to the ability to build all the gas production steps if necessary on a very large scale thus permitting the centralisation of the gas generation steps where several or all direct reduction modules are required. Minimal steam generator facilities are required relative to the steam reformer fed plants.

The process of the invention may be used to treat gas streams obtained by oxidation of carbonaceous materials, i.e. coal, oil, coke, with air to produce a suitable reducing gas and accordingly in the case of the blast furnace the source gas may be derived from the top gas of the blast furnace or from partial oxidation of oil and/or coal. In either case the source gas is treated to remove undesirable components, the nitrogen and hydrogen separated and the hydrogen stream injected into the furnace.

The invention will now be described with reference to the accompanying drawings, in which.

Figure 1:
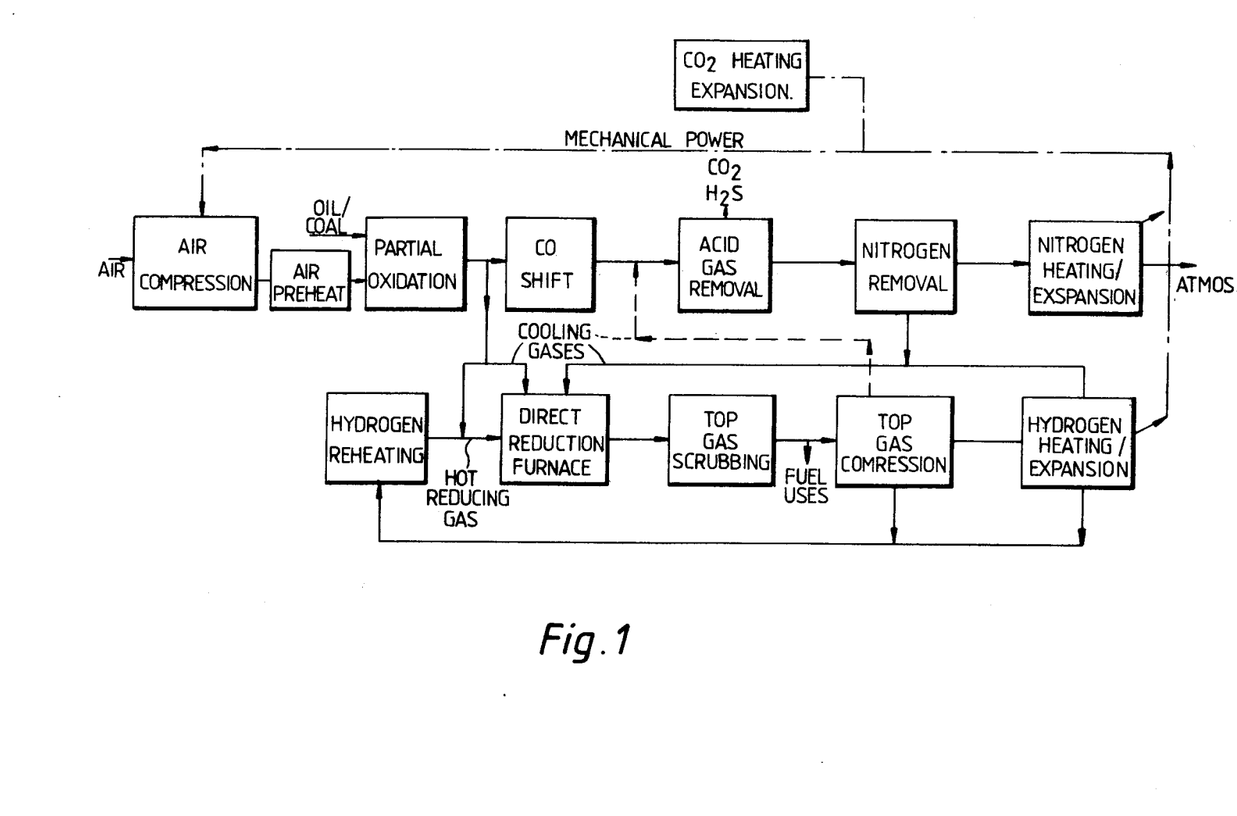
FIG. 1 represents a flow diagram of a system for the direct reduction of iron ore incorporating the process of the invention.

Oil or coal or a combination thereof, air and steam are fed into a conventional partial oxidation reaction. The reaction is generally conducted at a pressure of up to 50 bar and at a temperature of 300° to 1000° C. The oxidation may be conducted at atmospheric pressure in which case the gas stream is pressurised at a later stage in the process. The resulting gas stream is passed to a quench/waste heat boiler and thereafter the carbon monoxide content is substantially eliminated by passing the gas over a conventional high temperature shift catalyst generally at a temperature of 200° to 500° C. The reaction which takes place, leaving the reducing content of the gas unchanged, is:

$$CO + H_2O \rightarrow CO_2 + H_2.$$

Catalysts are available to promote this reaction which are tolerant to the levels of sulphur in the gas stream e.g. cobalt molybdate. Alternatively, the gas may be desulphurised prior to passage over the shift catalyst. In the former case the gas mixture containing hydrogen, nitrogen, carbon dioxide, methane, hydrogen sulphide and traces of carbon monoxide is then passed to an acid gas removal stage where carbon dioxide and hydrogen sulphide are removed. There are many types of processes for such gas removal including washing with hot potassium carbonate, e.g. at a temperature of 70° to 110° C., and the Rectisol process. The waste carbon dioxide may be vented to the atmosphere.

The gas stream may also undergo a liquid nitrogen washing to remove residual gases such as carbon monoxide. The liquid nitrogen used may be obtained from the cryogenic separation stage described hereinafter.

The gas mixture now containing hydrogen, nitrogen plus a little carbon monoxide and methane is then dried by cooling initially as far as possible and subsequently by contact with molecular sieve absorbent which also removes remaining traces of carbon dioxide. The dried gas is then passed to a cryogenic nitrogen/hydrogen separator, e.g. one which uses Joule Thomson cooling and regenerative heat exchange. The gas stream is contacted with heat exchange elements cooling the gas to about 100 K and condensing out the nitrogen. The amount of nitrogen removed may be varied according to the conditions in the separator, generally of the order of 90% of the original nitrogen content is removed.

The separated hydrogen stream, containing a little nitrogen, leaves the cryogenic separator at a slightly lower pressure than at the inlet. The hydrogen stream may be simply heated and injected directly into the furnace. However, preferably the gas is passed through a heater to raise the temperature, e.g. up to 1200° C., generally 500° to 750° C., then expanded through a turbine to generate power. The hydrogen is then reheated to a temperature of 1200° C., generally 700° to 950° C., preferably 750° to 900° C., and finally injected into the direct reduction furnace at a suitable point.

At least a portion of the liquid nitrogen which is condensed in the cryogenic separator may be used in a washing treatment for the gas stream as described above. This expedient obviates dependence on an external source of liquid nitrogen as in classical nitrogen wash plants.

The separated nitrogen stream, containing a little hydrogen plus most of the methane and carbon monoxide present in the feed, leaves the cryogenic separator at a somewhat lower pressure than at the inlet e.g. 5 to 20 bar, generally 5 to 10 bar, but sufficient to give useful power when heated and passed through an expansion turbine. Alternatively since it is available at pressure and contains combustibles, it may be used as supplementary fuel and working fluid for the expansion section of an open cycle gas turbine or simply for general fuel purposes.

The power generated by the expansion of the hydrogen and nitrogen streams as described may contribute to that required to drive the air compressor for the partial oxidation. In some cases the carbon dioxide removed may be obtained at pressure separately or with the waste nitrogen stream and gases may be heated and expanded to provide power.

Figure 2:
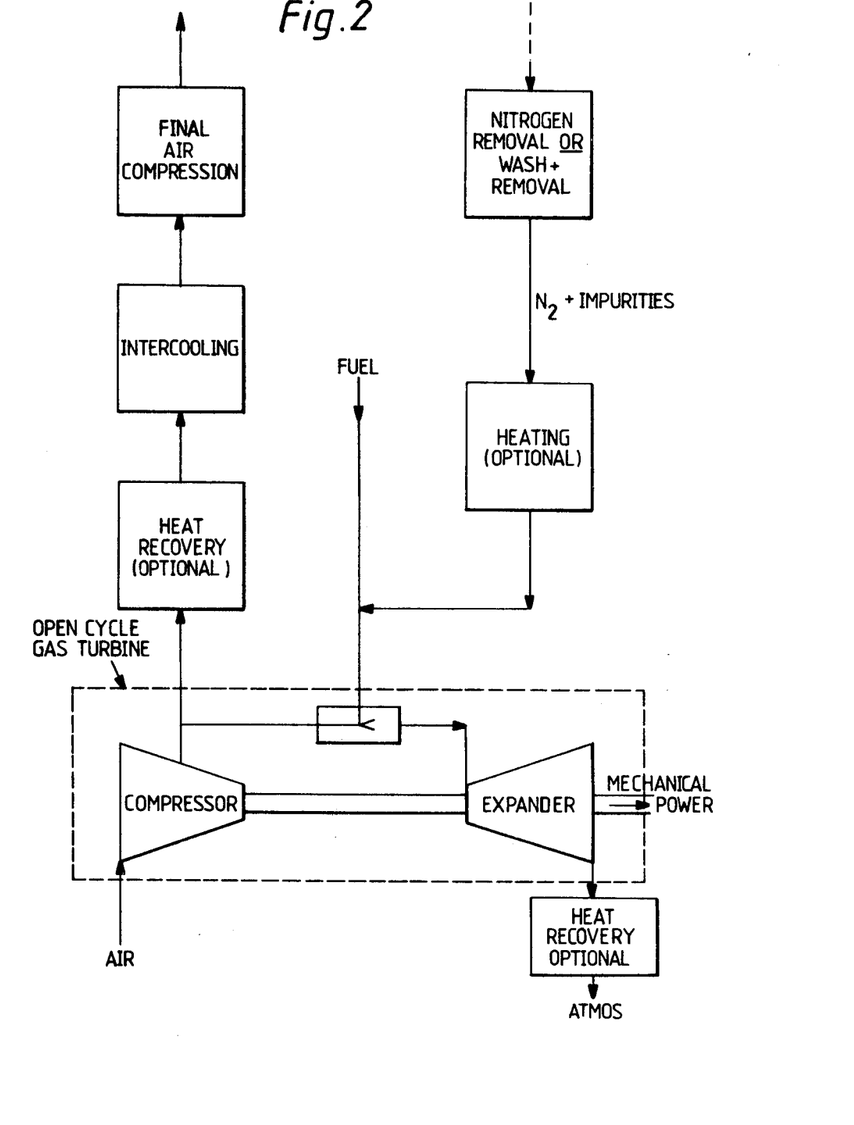
FIG. 2 represents an open cycle gas turbine suitable for use in the invention.

In the event of the waste nitrogen being employed in an open cycle gas turbine, as mentioned above, the combustion air compressor of the turbine can be used as a first stage of the partial oxidation air compressor.

FIG. 2 illustrates a suitable gas turbine system. The waste nitrogen may be heated to the turbine inlet temperature by indirect heat exchange and/or by direct combustion of its combustible content, i.e. traces of methane, hydrogen, carbon monoxide with supplementary air and additional fuel as required upstream of the turbine. In the embodiment shown the nitrogen is mixed with supplementary fuel and fed to the combustion chamber of the gas turbine as fuel. At the same time the process air requirement for the partial oxidation is bled from the gas turbine compressor discharge. By this expedient approximate parity is maintained between the mass flows in the compressor and expander sections of the gas turbine and an efficient means of compression and expansion provided using developed industrial equipment designs.

A bleed stream of carbon monoxide containing gas may be taken from before the shift stage previously mentioned and fed into the direct reduction furnace either as cooling gas or with the hot gas previously mentioned. In the latter case the mixture of the two gas streams ideally takes place as soon as possible before injection to the furnace. The use of a bleed stream of carbon monoxide containing gas allows the carbon monoxide content of the reducing gas in the direct reduction furnace to be adjusted and therefore the amount of carbon contained in the product iron may be controlled. The carbon content of the iron may also be adjusted by the addition of a small amount of solid carbon at a suitable stage in the furnace.

In addition, a stream of cold hydrogen gas from the cryogenic separation may also be used for cooling of the direct reduction furnace iron product if required.

The top gases from the direct reduction furnace which contain reducing gases may be passed to gas scrubbing and water removal and then compressed and recirculated. If desired the top gas may be recirculated through the acid gas removal and cryogenic condenser to provide an additional means of eliminating nitrogen and carbon dioxide from the shaft furnace gas circuit. Since the carbon monoxide proportion of this gas is generally fairly low it is possible for it to be passed through the gas heater when mixed with the fresh hydrogen from the cryogenic unit without risk of carbon deposition. In some cases these gases may be used elsewhere in particular to regulate the temperature of the hot hydrogen reducing gas, or cooling gas or as a fuel for the various gas heaters.

Figure 3:
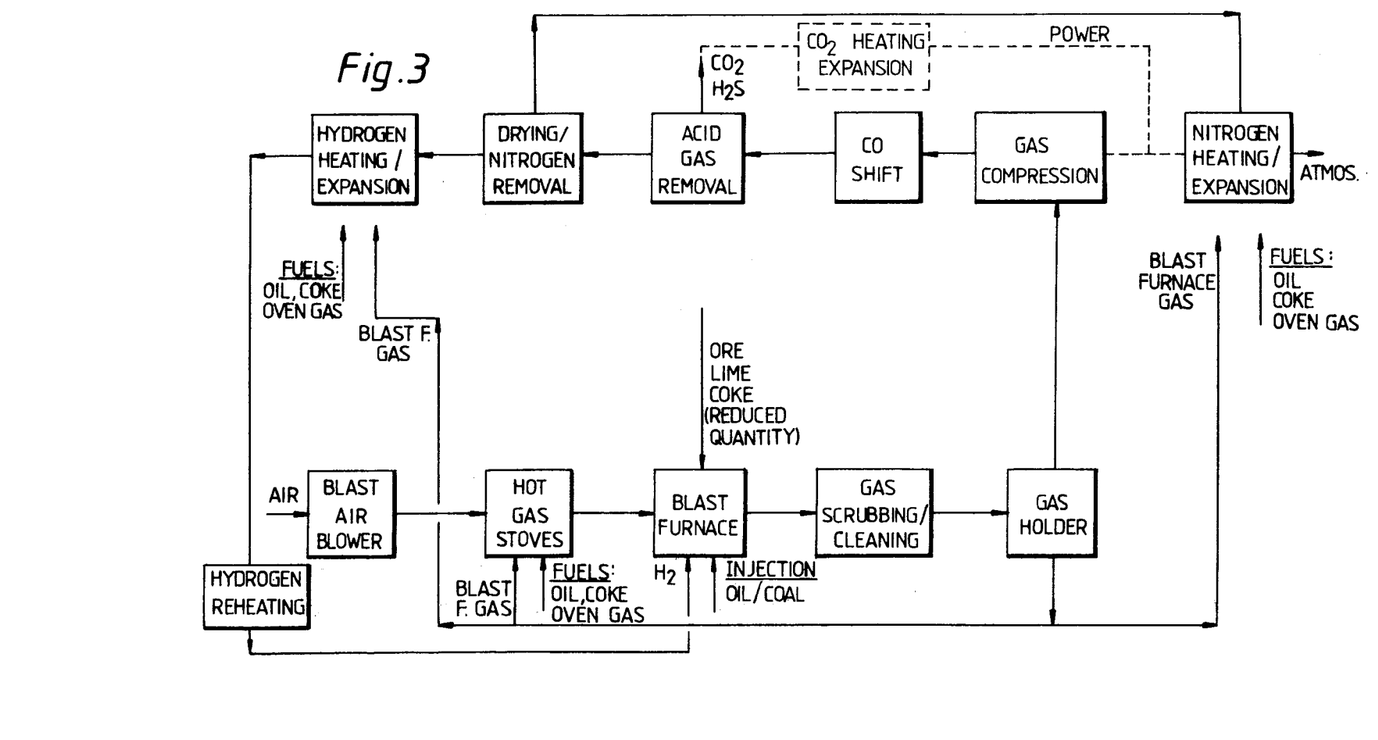
FIG. 3 represents a flow diagram of a blast furnace system incorporating the process of the invention in which the source gas is derived from the blast furnace top gas.

In the blast furnace system illustrated in FIG. 3 the blast air normally at pressures up to 4 to 5 bar is heated in gas stoves which are primarily fueled by coke oven gas or oil to a temperature of up to 1200° C., generally 800° to 1000° C. Gas from the top of the blast furnace is collected and cleaned in scrubbers and electrostatic precipitators and passed to a gas holder as in conventional practice. Gas from the holder predominantly containing nitrogen, carbon dioxide, carbon monoxide, hydrogen and water vapour is compressed to a pressure generally from 10 to 50 bars, preferably about 25 bars, some water vapour is added and the carbon monoxide content is substantially eliminated by passing the gas over a conventional shift catalyst as described in relation to FIG. 1.

The resulting gas stream then undergoes a series of treatment stages as shown in FIG. 3 which are fully described above with reference to FIG. 1.

The resulting hydrogen stream is heated and injected into the blast furnace at a suitable point.

The optimum point of injection of the reducing hydrogen gas can be chosen purely from the aspect of optimum blast furnace performance. This is advantageous over the prior art, in which recycled top gas containing nitrogen is injected, requiring an unusually high degree of oxygen enrichment of the blast at the tuyeres in compensation. To avoid excessively high temperatures in the tuyere region, the recycle gas in that prior art must at least in part be injected at the tuyeres.

It will be seen that any hydrogen injected into the blast furnace according to this embodiment which passes out of the top of the furnace shaft is not lost to the furnace but is recycled to it.

Since the hydrogen concentration in the shaft gas may be higher in this embodiment that in other prior art reducing gas injection processes, the iron production rates may be increase. In addition, gas pressure losses will be less at a given production rate both because of the lower molecular weight of gas in the shaft and because of the lower amounts of blast air required with reducing gas injection relative to other practice. Thus capacity of the blast air system should provide no obstacle to any increase in production rate.

Since the top gas leaving the blast furnace according to this embodiment will contain appreciable water vapour whereas in normal practice there is little or none, some improvement in the reducing quality of the top gas can be achieved by just cooling the top gas to condense most of this water. Accordingly it is possible to achieve most of the beneficial effect of processing all the top gas as described in this invention, by processing part of the cooled top gas to produce injected hydrogen as described above and by injecting the remainder of the cooled top gas after compression and reheating directly into the blast furnace, such reheating preferably being along with the hydrogen injected to reduce the danger of carbon deposition in the heater.

It is believed that, due to the nature of the maximum limitations on the amount on the tuyere injection of oil/solid fuel and the inherent minimum in the amount of metallurgical coke feed, it is still advantageous to maximise tuyere injection in combination with hydrogen injection at an optimum point to achieve a further decrease in coke consumption compared with prior art. The effect of hydrogen injection may be thought of as equivalent to the use of a prereduced iron ore feed to the blast furnace proper.

Any deficiency in overall works fuel supply resulting from the use of the top gas may be made good by the combustion of gas, oil or coal from external sources. However, in some instances it may be desirable to utilize a portion of the blast furnace top gas as a fuel, e.g. in the hot gas stoves as indicated in FIG. 3.

Figure 4:
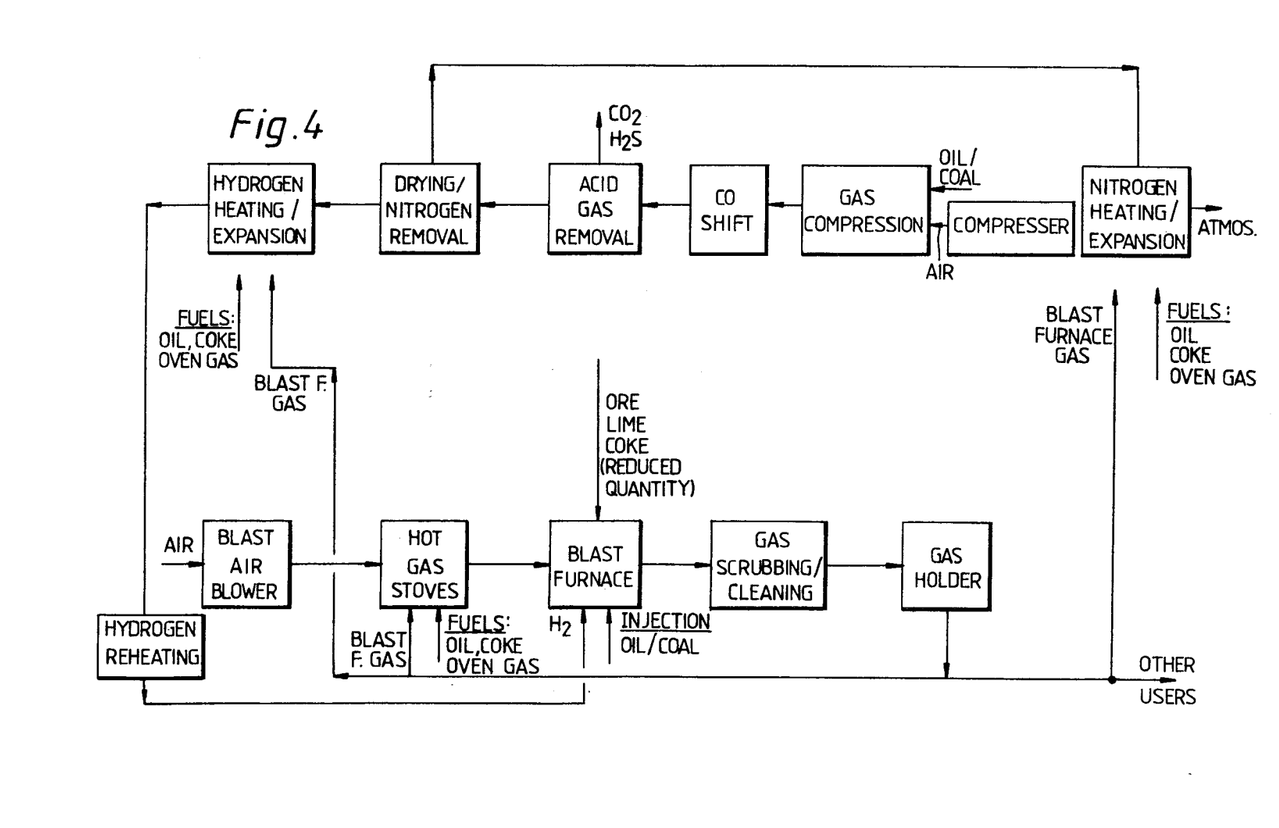
FIG. 4 represents a flow diagram of a blast furnace system incorporating the process of the invention in which the source gas is derived from the partial oxidation of coal and/or oil.

In an alternative embodiment shown in FIG. 4 the cryogenic principle previously mentioned is used to make a hydrogen-rich gas stream from heavy oil or coal for injection but using air rather than oxygen as in prior art. Blast furnace gas is used as fuel within the blast furnace circuit and in the integrated steel works as in conventional practice. Oil or coal or a combination of the two, air and steam are fed to a proprietary type of partial oxidation unit generally operating at a pressure of 15 to 50 bar and a temperature of 30° to 1000° C. The gases leaving are passed to a quench/waste heat boiler stage and then to a sulphur tolerant shift reaction catalyst as mentioned previously to convert the carbon monoxide to hydrogen and carbon dioxide, e.g. cobalt molybdate. Alternatively the gas may be desulphurised prior to passage over the shift catalyst. The gas mixture containing hydrogen, carbon dioxide, nitrogen, hydrogen sulphide with traces of carbon monoxide then undergoes a series of treatment stages as described above with reference to FIG. 1.

The separated hydrogen-rich gas is fed via a heater, expander and reheater into the blast furnace in a similar manner to the system of FIG. 3. Likewise the separated nitrogen-rich gas is heated and expanded and fed to a gas turbine. The power which is generated by the expansion contributes typically to driving the air compressor for the partial oxidation gasifier.

In some cases the carbon dioxide removed may be obtained at pressure, either separately from or mixed with the waste nitrogen stream and thus be heated and expanded to provide power.

The separated nitrogen used in an open cycle gas turbine and the combustion air compressor of that gas turbine can be used advantageously as the first stage of the air compressor.

This scheme enables production of reducing gas from oil without using oxygen supplied in considerable quantities from an air separation plant. In the past when partial oxidation techniques have been used in blast furnace systems to make reducing gas for injection, oxygen has been used. Moreover, although in prior art the product from oxygen fed partial oxidation units being hot may be injected directly into the blast furnace, the reducing potential of such gases is much smaller than that of the gas injected in both embodiments of this invention, in view of the considerable carbon dioxide and water contents. Comparable quench, shift, acid gas and removal and reheat steps must follow in order to produce a high reducing potential gas by partial oxidation with oxygen.

It will be readily appreciated that a combination of both embodiments may be employed in which a portion of top gas may be recycled and further reducing gas supplied by partial oxidation of oil or coal.

In all of the processes illustrated in the drawings the various gas heaters are illustrated separately. In practice all of the gases may readily be heated in a single furnace.

We claim:
1. A process for producing a reducing gas for direct reduction furnaces and blast furnaces which comprises:
   (a) partially oxidising a feedstock selected from the group consisting of oil, coal, and coke and combinations thereof, in the presence of air and steam at a pressure of 1 to 50 bar and at a temperature of 300° to 1000° C. to produce a raw gas stream containing hydrogen, nitrogen, carbon monoxide, and other gases,
   (b) passing the raw gas stream over a shift catalyst at a temperature of 200° to 500° C. whereby carbon monoxide is substantially eliminated from the gas stream;
   (c) passing the gas stream through an acid gas removal stage wherein carbon dioxide and hydrogen sulfide are substantially removed from the gas stream, whereby a gas stream consisting essentially of hydrogen and nitrogen is produced;

(d) drying the gas stream if there is water present;

(e) passing the gas stream to a cryogenic nitrogen/hydrogen separator wherein the gas stream is cooled to a low temperature and a hydrogen-rich stream is separated from a nitrogen-rich stream;

(f) heating the hydrogen-rich gas stream; and (g) injecting the hydrogen-rich stream into the furnace.

2. A process as claimed in claim 1 in which the hydrogen-rich gas stream leaving the cryogenic separator is heated and expanded through a turbine to generate power.

3. A process as claimed in claim 1 or claim 2 in which the nitrogen-rich stream leaving the cryogenic separator is heated and expanded through a turbine to generate power.

4. A process as claimed in any preceding claim in which the gas stream is subjected to scrubbing with hot potassium carbonate to remove the acid gas content prior to the separation stage.

5. A process as claimed in any preceding claim in which the gas stream is subjected to liquid nitrogen washing to remove carbon monoxide in the gas stream prior to the separation stage.

6. A process as claimed in claim 5 in which the separation stage is conducted in a cryogenic separator and the liquid nitrogen in the washing step is obtained from the nitrogen condensed in the cryogenic separator.

7. A process as claimed in any preceding claim in which the reducing gas is obtained by partial oxidation of a feedstock selected from the group consisting of coal and oil and combinations thereof, and the hydrogen-rich stream from the separation stage is heated and injected into a direct reduction furnace for the reduction of iron ore.

8. A process as claimed in claim 7 in which top gas from the furnace is recirculated through an acid gas removal stage and cryogenic separator and thence back to the furnace.

9. A process as claimed in any one of claims 1 to 4 in which the reducing gas is obtained by partial oxidation of a feedstock selected from the group consisting of coal and oil and combinations thereof, and the hydrogen-rich stream from the separation stage is injected into a blast furnace.

10. A process as claimed in any one of claims 1 to 8 and 9 in which at least a portion of the reducing gas is derived from top gas from a blast furnace which is treated to remove particulate matters and thereafter purified and separated, the hydrogen-rich stream being heated and injected into the blast furnace.

* * * * *

UNITED STATES PATENT AND TRADEMARK OFFICE
CERTIFICATE OF CORRECTION

PATENT NO. : 4,363,654

DATED : December 14, 1982

INVENTOR(S) : Geoffrey Frederick et al.

It is certified that error appears in the above-identified patent and that said Letters Patent is hereby corrected as shown below:

On the title page, Item [76] Inventors:

"Geoffrey Frederick" should read -- Geoffrey F. Skinner --

"Anthony Dwight" should read -- Anthony D. Maunder --.

Signed and Sealed this

Nineteenth Day of April 1983

[SEAL]

Attest:

GERALD J. MOSSINGHOFF

Attesting Officer

Commissioner of Patents and Trademarks